Sept. 18, 1928.
W. E. PABST
COUNTERBORING HEAD
Filed May 7, 1925
1,684,804
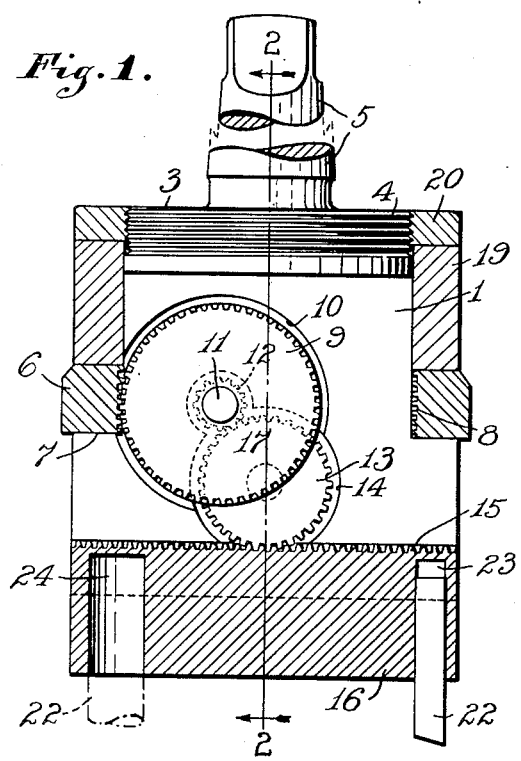
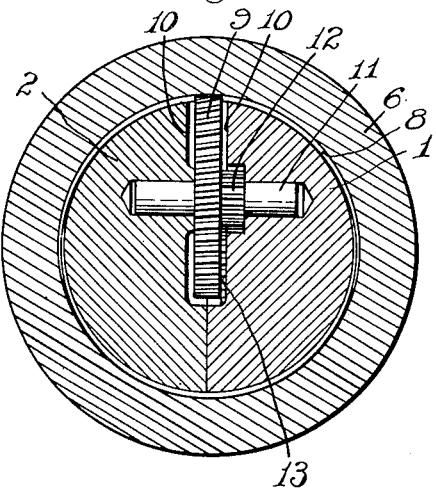
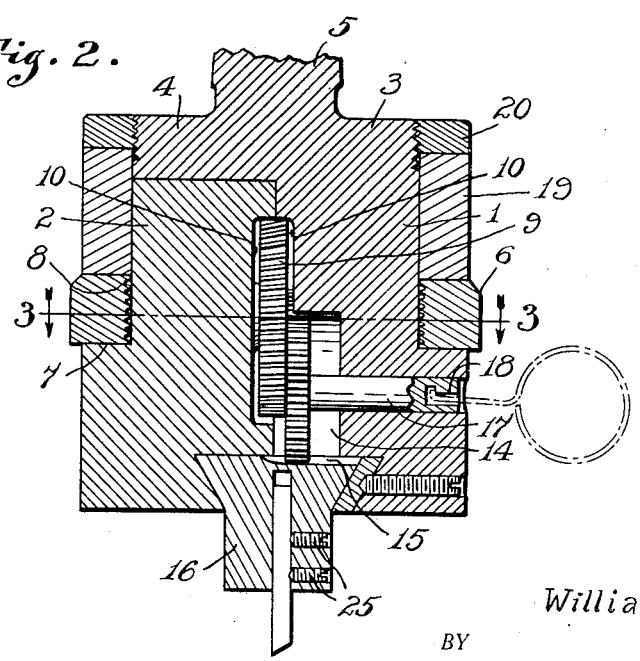
INVENTOR.
William E. Pabst,
BY
Hood + Hahn.
ATTORNEYS Patented Sept. 18, 1928.

1,684,804

UNITED STATES PATENT OFFICE.

WILLIAM E. PABST, OF ANDERSON, INDIANA.

COUNTERBORING HEAD.

Application filed May 7, 1925. Serial No. 28,568.

My invention relates to improvements in counter-bores and has particular reference to means for imparting to the cutting tool a radial movement during the rotation of the head.

For the purpose of disclosing my invention I have illustrated one embodiment thereof in the accompanying drawings in which Fig. 1 is a longitudinal sectional view of a counter-boring head embodying my invention;

Fig. 2 is a sectional view taken on the line 2—2 of Fig. 1;

Fig. 3 is a sectional view taken on the line 3—3 of Fig. 2.

In the embodiment illustrated the head proper comprises a cylindrical block formed in two sections 1 and 2. The section 1 is provided with a top 3 which has a portion overlapping the section 2 and provided with the tapered shank 5 for insertion in a chuck head or other similar driving tool. The upper portion of the head proper is reduced in diameter and carries a ring 6 resting on an annular shoulder 7 and having its inner face provided with an internal worm rack 8. This rack is adapted to mesh with a worm gear 9 mounted in recesses 10 formed in the adjacent faces of the sections 1 and 2 and provided with a rotating shaft 11. Mounted on the shaft 11 is a pinion 12 in turn adapted to mesh with a gear 13 arranged in a recess in the adjacent faces of the sections 1 and 2. This recess being enlarged as at 14 to permit a transverse movement of the gear 13 so that the gear may be moved laterally to disengage the same from the pinion 12, the gear 14 meshes with a rack 15 on the upper face of a tool carrier 16 which is transversely slidable in a V shaped slot formed at the bottom of the head. This rack is made of sufficient width so that the gear 13 will remain in engagement with the teeth thereof after it has been laterally moved out of engagement with the pinion 12 and for moving the gear 13 transversely, the shaft 17 thereof extends through the section 1 and is provided at its outer end with a key slot 18 adapted to be engaged by a suitable key for manipulating the gear.

The two sections 1 and 2 are held in their assembled position by a collar 19 surrounding the upper portion of the same, which collar bears upon and maintains in position the ring 6 and in turn is held in position by a ring 20 threaded upon the upper portion of the section 1.

The tool holder 16 is adapted to receive various types of tools, such as 22, which are held in suitable sockets 23 or 24 by means of any clamping members as set screws 25.

In operation, when it is desired to move or set the tool holder radially the gear 13 is disengaged from the pinion 12 by pulling on its shaft 17. The gear is thus moved transversely and an end of the shaft will project beyond the surface of the head to be grasped by the operator and rotated so as to quickly project the tool holder radially to any position desired. If the tool holder has been set by moving the gear 13 back into mesh with the pinion 12 it will be locked in this position. If it is desired to move the tool holder radially during the rotation of the head, the operator simply grasps the ring 6 holding the same stationary relatively to the rotation of the head and thus drives through the relative movement between the worm gear 9 and the ring 6 the gear train to radially move the tool holder.

I claim as my invention:

1. In a device of the character described, the combination with a split head, of a tool carrier mounted on said head and transversely movable thereon, a gear train mounted between the sections of said head, one of the gears having operative connection with said tool carrier and having another of the gears extending to the periphery of said head, and an annular rack member surrounding said head in engagement with said second mentioned gear, and rotatably movable with respect to said head for driving said gear train whereby said tool carrier is transversely adjusted in the head.

2. In a device of the character described, the combination with a split head, of a tool carrier mounted on said head and transversely movable thereon, a worm drive gear for driving said tool carrier transversely of the head mounted between the sections of said head and extending to the periphery thereof, an annular worm rack surrounding said head engaging said gear and rotatably movable with respect to said head, said rack when stationary with respect to said head being adapted to lock said tool carrier in any adjusted position.

3. In a device of the character described, the combination with a split head, of a tool carrier mounted on said head and transversely movable thereon, a worm gear mounted on said head between the sections thereof and extending to the periphery of the head, means for connecting and disconnecting said worm gear with said tool carrier and an annular worm rack member surrounding said head rotatably movable with respect thereto and arranged to drive said worm gear.

4. In a device of the character described, the combination with a split head, of a tool carrier mounted thereon and transversely movable thereon and having a rack, a gear mounted on said head between said sections and engaging said rack and movable transversely of said tool carrier, a worm gear mounted on said head between said sections, a pinion arranged to be meshed with said first mentioned gear and driven by said worm gear and an annular worm rack mounted on said head engaging said worm gear and rotatably movable with respect to said head for the purpose of rotating said worm gear.

In witness whereof, I WILLIAM E. PABST have hereunto set my hand at Anderson, Indiana, this 4 day of May, A. D. one thousand nine hundred and twenty-five.

WILLIAM E. PABST.